United States Patent [19]

Gauker

[11] Patent Number: 5,746,618

[45] Date of Patent: May 5, 1998

[54] SQUIB CONNECTOR FOR AUTOMOTIVE AIR BAG ASSEMBLY

[75] Inventor: Bradford K. Gauker, Clinton Township, Mich.

[73] Assignee: Augat Inc., Mansfield, Mass.

[21] Appl. No.: 705,427

[22] Filed: Aug. 29, 1996

Related U.S. Application Data

[62] Division of Ser. No. 502,523, Jul. 14, 1995, Pat. No. 5,616,045.

[51] Int. Cl.⁶ .................................................. H01R 13/627
[52] U.S. Cl. .......................... 439/352; 439/595; 439/466
[58] Field of Search ........................ 439/15, 352, 135, 439/595, 746, 747, 741, 733, 466, 749

[56] References Cited

U.S. PATENT DOCUMENTS

| | | | |
|---|---|---|---|
| Re. 34,693 | 8/1994 | Plocek et al. | 439/15 |
| 3,997,224 | 12/1976 | Ogawa et al. | 439/15 |
| 4,006,954 | 2/1977 | Ikawa et al. | 439/17 |
| 4,687,278 | 8/1987 | Grabbe et al. | 439/842 |
| 4,722,551 | 2/1988 | Adams | 280/736 |
| 4,759,723 | 7/1988 | Siemon | 439/459 |
| 4,786,258 | 11/1988 | Shaffer et al. | 439/188 |
| 4,813,882 | 3/1989 | Ruiz | 439/101 |
| 4,850,888 | 7/1989 | Denlinger et al. | 439/188 |
| 4,867,699 | 9/1989 | Oda et al. | 439/355 |
| 4,871,325 | 10/1989 | Maejima et al. | 439/353 |
| 4,875,875 | 10/1989 | Archer et al. | 439/401 |
| 4,878,853 | 11/1989 | Yamade et al. | 439/144 |
| 4,884,978 | 12/1989 | Inaba et al. | 439/352 |
| 4,893,109 | 1/1990 | Vrabel et al. | 340/438 |
| 4,904,190 | 2/1990 | Plocek et al. | 439/15 |
| 4,906,203 | 3/1990 | Margrave et al. | 439/188 |
| 4,919,620 | 4/1990 | Yamaguchi et al. | 439/15 |
| 4,941,839 | 7/1990 | Nagasaka et al. | 439/352 |
| 4,943,240 | 7/1990 | Karlsson | 439/15 |
| 4,973,589 | 11/1990 | Shodai | 307/10.1 |
| 4,978,191 | 12/1990 | Hasegawa et al. | 350/96.2 |
| 4,978,311 | 12/1990 | Oda et al. | 439/188 |
| 4,988,307 | 1/1991 | Muzslay | 439/188 |
| 4,992,064 | 2/1991 | Steinhardt et al. | 439/845 |
| 4,993,967 | 2/1991 | Matsumoto | 439/489 |
| 5,009,604 | 4/1991 | Plocek et al. | 439/15 |
| 5,010,784 | 4/1991 | Nakazato et al. | 74/498 |
| 5,011,423 | 4/1991 | Reuter | 439/341 |
| 5,015,199 | 5/1991 | Hirano et al. | 439/353 |
| 5,045,641 | 9/1991 | Urushibata et al. | 174/74 R |
| 5,055,058 | 10/1991 | Nagasaka et al. | 439/188 |
| 5,067,916 | 11/1991 | Denlinger et al. | 439/857 |
| 5,069,632 | 12/1991 | Avitan | 439/188 |
| 5,086,284 | 2/1992 | Mouissie | 335/205 |
| 5,108,309 | 4/1992 | Oda et al. | 439/595 |
| 5,135,408 | 8/1992 | Suzuki | 439/310 |
| 5,136,275 | 8/1992 | Madau et al. | 340/438 |
| 5,139,438 | 8/1992 | Gaffney | 439/352 |
| 5,145,356 | 9/1992 | Minnis | 439/352 |
| 5,149,127 | 9/1992 | Manabe et al. | 280/731 |

(List continued on next page.)

FOREIGN PATENT DOCUMENTS

0601564A2  6/1994  European Pat. Off.
4010440C1  10/1991  Germany.

*Primary Examiner*—Neil Abrams
*Assistant Examiner*—T. C. Patel
*Attorney, Agent, or Firm*—Weingarten, Schurgin, Gagnebin & Hayes

[57] ABSTRACT

A squib connector for automotive air bag assemblies is disclosed. The squib connector includes a connector position assurance mechanism (CPA) to ensure that the connector is properly connected to the squib receptacle and a connector lock assurance mechanism (CLA) to ensure that the connector is locked into the receptacle. The connector includes a pair of terminals each having contact beams which provide at least four points of contact with the terminals of the squib. Primary and secondary terminal latches ensure that the terminals are firmly retained within the connector. Wire strain relief is provided by placing an intentional bend in the wires and rounding the end of the connector where the wires enter.

6 Claims, 5 Drawing Sheets

U.S. PATENT DOCUMENTS

| | | | |
|---|---|---|---|
| 5,174,785 | 12/1992 | Endo et al. | 439/489 |
| 5,174,786 | 12/1992 | Kato et al. | 439/489 |
| 5,178,547 | 1/1993 | Bonas et al. | 439/34 |
| 5,186,639 | 2/1993 | Comerci et al. | 439/188 |
| 5,200,574 | 4/1993 | Cunningham et al. | 102/530 |
| 5,226,830 | 7/1993 | Ueno | 439/164 |
| 5,238,419 | 8/1993 | Roeder et al. | 439/164 |
| 5,241,910 | 9/1993 | Cunningham et al. | 102/530 |
| 5,259,773 | 11/1993 | Champion et al. | 439/108 |
| 5,275,575 | 1/1994 | Cahaly et al. | 439/188 |
| 5,277,608 | 1/1994 | Oda | 439/188 |
| 5,295,846 | 3/1994 | Sumida et al. | 439/188 |
| 5,297,976 | 3/1994 | VanDerStuyf et al. | 439/271 |
| 5,306,180 | 4/1994 | Buhr | 439/620 |
| 5,310,362 | 5/1994 | Bäuerle et al. | 439/620 |
| 5,314,341 | 5/1994 | Kazita et al. | 439/15 |
| 5,314,345 | 5/1994 | Cahaly et al. | 439/188 |
| 5,316,507 | 5/1994 | Capp | 439/886 |
| 5,324,074 | 6/1994 | Christian et al. | 280/728 R |
| 5,326,290 | 7/1994 | Chailleux et al. | 439/862 |
| 5,358,433 | 10/1994 | Dechanteloup et al. | 439/843 |
| 5,370,543 | 12/1994 | Hamada et al. | 439/188 |
| 5,376,017 | 12/1994 | Taniuchi et al. | 439/375 |
| 5,378,165 | 1/1995 | Comerci et al. | 439/188 |
| 5,389,002 | 2/1995 | Matsuda et al. | 439/164 |
| 5,391,087 | 2/1995 | Fukuda | 439/188 |
| 5,401,180 | 3/1995 | Muzslay | 439/188 |
| 5,435,754 | 7/1995 | Hotea et al. | 439/620 |
| 5,454,593 | 10/1995 | Armstrong et al. | 280/741 |
| 5,458,371 | 10/1995 | Fulmer et al. | 280/741 |
| 5,462,449 | 10/1995 | Tsuji et al. | 439/188 |
| 5,468,163 | 11/1995 | Egenolf | 439/839 |
| 5,482,316 | 1/1996 | Lang et al. | 280/741 |

SQUIB CONNECTOR FOR AUTOMOTIVE AIR BAG ASSEMBLY

This application is a division of application Ser. No. 08/502,523, filed Jul. 14, 1995, now U.S. Pat. No. 5,616,045.

FIELD OF THE INVENTION

This invention relates to the field of connectors and more particularly to squib connectors for automotive air bag assemblies.

BACKGROUND OF THE INVENTION

Supplemental inflatable restraints or air bag assemblies are becoming increasingly common as a safety device in vehicles throughout the world. The assembly comprises an inflatable canister located in the steering column or the passenger-side dashboard. Upon a sufficiently great deceleration, the canister is inflated by an explosive device known as a squib which contains a gun powder-based material. The squib is fired electronically upon an electrical signal sent via wires from a deceleration sensor in the vehicle. The wires are attached to the squib via a squib connector which plugs into a receptacle in the squib and is typically retained therein by a friction fit.

Prior art squib connectors are shown in U.S. Pat. Nos. 5,314,345 and 5,178,547. The squib connector of the '345 patent is an example of a prior art connector which is frictionally fitted within the squib receptacle and must be pried out, which risks damaging the connector. In addition, this connector includes a locking clip attached with a tether to the connector. This locking clip is somewhat difficult to align, because it must be done visually. Additional commercially available prior art squib connectors include Models UT12367, UT13308, and UT13309 from Morton International.

The integrity of the wire connection to the squib must be maintained to ensure that the squib will fire when the deceleration sensor senses a sufficiently great deceleration and sends a signal to the squib. The squib connector is particularly subject to failure due to handling during manufacture of the vehicle and during replacement of a spent air bag assembly. The connector must keep out dust and moisture and withstand the vibrations, shocks, and temperature extremes associated with operation of the vehicle in which the connector is located. Thus, a need exists for a robust squib connector.

SUMMARY OF THE INVENTION

The present invention provides a squib connector having a connector body sized to fit within an initiator receptacle of a squib. A pair of box terminals is located internally of the connector body for electrical communication with the initiator pins in the squib receptacle. The squib connector also includes a cover and a combination connection position assurance member or CPA and connector lock assurance member or CLA overlying the cover. A pair of wires from the deceleration sensor enter the connector body through a space between the cover and the body. A wire crimping device in electrical communication with the box terminal fixes the wires to the box terminal.

The connector provides primary strain relief for the entering wires by intentionally kinking or bending the wires at the point where they enter the connector body. Secondary strain relief is provided by forming the end of the cover with a curved surface to prevent the wires from bending too much.

Each box terminal includes two contact beams which are bent to extend upwardly within the box and biassed into contact with opposite sides of the initiator pins of the squib receptacle. Each contact beam is curved near its free end to wrap around the initiator pin to provide at least four points of contact per box terminal. A conductive strip is provided on each contact beam in the area where the beam contacts the initiator pin. A lubricating material formed from the same material as the conductive strip is also provided on each contact beam to reduce friction during insertion to the initiator pin between the two opposed beams.

Each box terminal is held within the connector body by a primary terminal latch and a secondary terminal latch. The primary latch is integrally formed in the connector body by a first arm configured to seat against a top edge of the box of an associated box terminal. The secondary latch is integrally formed in the connector body by a second arm configured to seat against an end of a louver formed in one wall of the associated box terminal. Once in place, each box terminal is held securely between the first and second terminal latches and a floor of the connector body. The combination of the primary and the secondary terminal latches increases resistance to pulling the terminal out of the body.

The CPA/CLA is hinged to the connector body with a hinge pin integrally molded to the CPA/CLA to form a unitary structure. The CPA/CLA includes a connector position assurance mechanism to ensure that the connector is properly positioned on the initiator pins. Latching beams are formed on opposed sides of the connector body. A latching lug is formed near the base of each associated latching beam for mating with a recess in the initiator receptacle. To remove the connector from the receptacle, the latching beams are squeezed inwardly, thereby allowing the latching lugs to move out of the recesses. The CPA/CLA includes two openings to receive the ends of the latching beams when the CPA/CLA is in the closed position. The latching beams cannot fit into the openings unless the connector is properly seated and locked into the initiator receptacle.

The connector also includes a connector lock assurance (CLA) mechanism to ensure that the connector is locked into the initiator receptacle. The CLA includes two wedge members located to fit between each latching beam and an exterior surface of the connector body. When the CPA/CLA plate is pivoted into the closed position, the wedges are positioned between the latching beams and the connector body, thereby forcing the latching beams outwardly to lock the connector into the initiator receptacle.

The CPA/CLA includes a latching mechanism to hold it in the closed position onto the connector body. In the preferred embodiment, latching fingers depend from the underside of the CPA/CLA plate to mate with suitable lugs extending outwardly from the wall of the connector body.

One or more orientation keys may be provided on the connector body to orient the body properly in the initiator receptacle.

DESCRIPTION OF THE DRAWINGS

The invention will be more fully understood from the following detailed description taken in conjunction with the accompanying drawings in which.

DETAILED DESCRIPTION OF THE INVENTION

Figure 1:
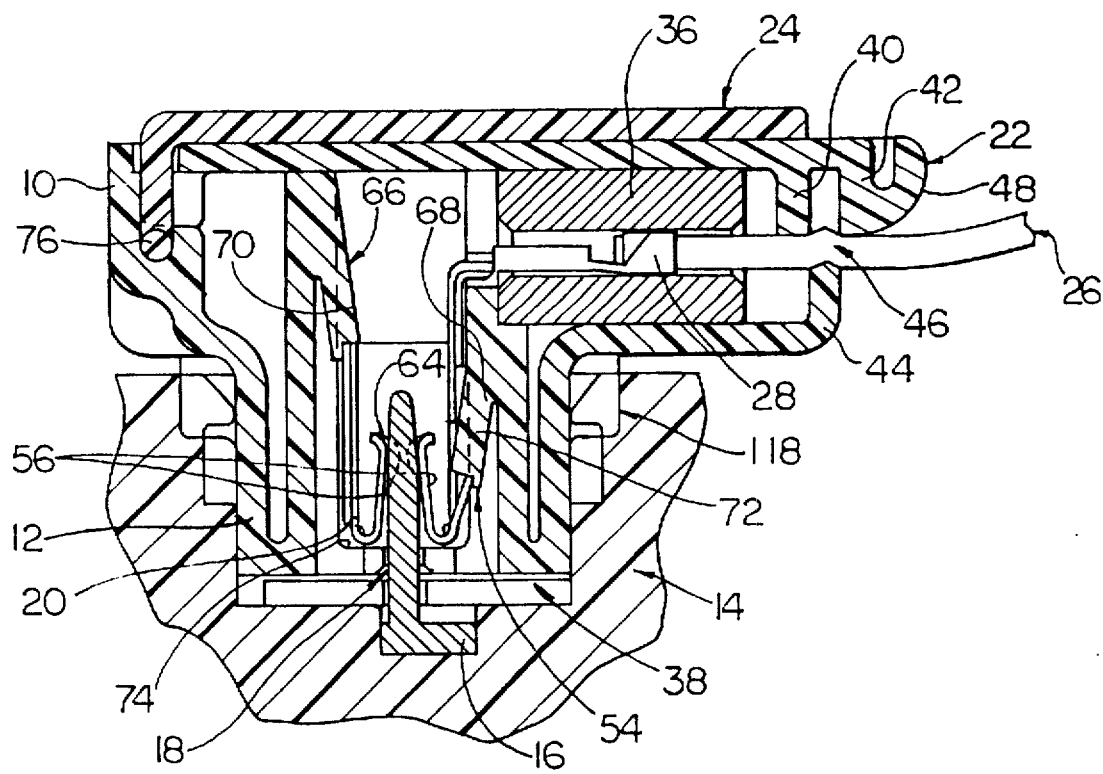
FIG. 1 is cross-sectional side view of a squib connector in accordance with the present invention.
Figure 2:
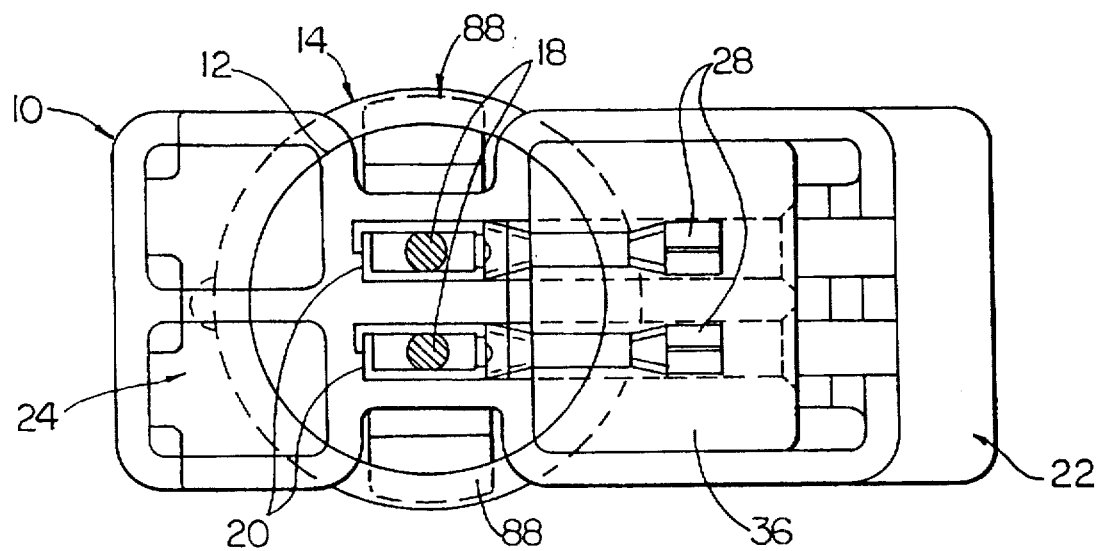
FIG. 2 is a partial cross-sectional plan view of the squib connector of FIG. 1.
Figure 3:
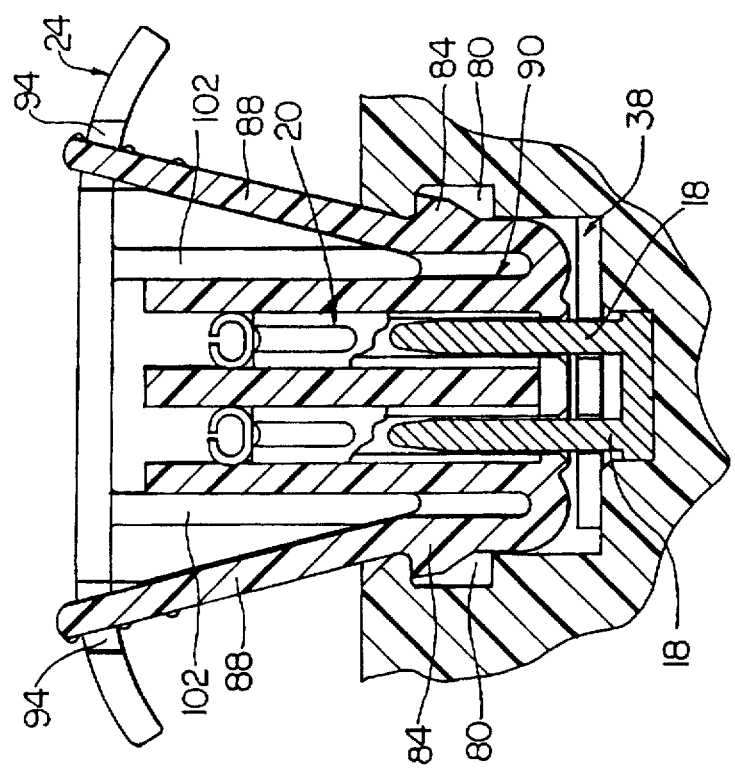
FIG. 3 is a partial cross-sectional end view of the squib connector of FIG. 1.

The squib connector of the present invention is shown in FIGS. 1 through 7. The connector includes a connector body 10 having a depending cylindrical portion 12 sized to fit within an initiator receptacle 14 of a squib 16. A pair of terminals or initiator pins 18 are anchored to the squib 16 within the receptacle. A pair of box terminals 20 is located internally of the connector body 10 to contact the initiator pins 18 for electrical communication therewith when the connector is mounted within the squib receptacle.

Figure 8:
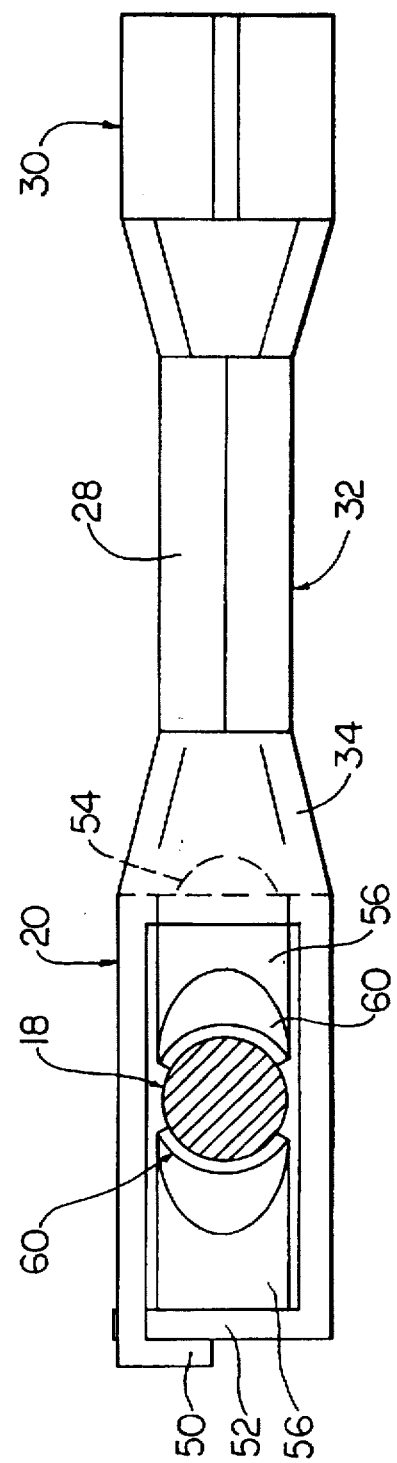
FIG. 8 is a plan view of a box terminal and wire crimping device of the squib connector of FIG. 1.

The squib connector also includes a cover 22 and a connector position assurance member and connector lock assurance or CPA/CLA 24 overlying the cover, discussed further below. A pair of wires 26 from the deceleration sensor enter the connector body 10 through a space between the cover 22 and the body 10. A wire crimping device 28 comprising an insulation grip 30 and a wire grip 32 fixes each wire within the body. The wire crimping device 28 is preferably formed as a single piece with the box terminal 20 via a suitable connecting member 34 to provide a good electrical communication path between the wires and the initiator pins of the squib, as shown in FIG. 8. The wire crimping device and box terminal are formed from a suitable conductive material such as beryllium copper grade 17410 available from Brush-Wellman of Cincinnati, Ohio. A ferrite or other inductive body 36 surrounds the wire crimping device 28 to prevent stray signals from affecting the squib. A shorting clip 38 is provided in the base of the receptacle to provide a shunt across the initiator pins when the connector is removed.

The connector body 10, cover 22, and CPA/CLA 24 may be formed from any suitable nonconducting material capable of meeting the structural requirements of the squib connector. A plastic material, nylon 6/6, having 15 percent glass fiber reinforcement has been found to be suitable.

The connector of the present invention provides strain relief for the wires 26 entering the connector in two ways. Primary strain relief is provided by two members 40, 42 depending from the cover 22 and a member 44 extending from the connector body 10. The extending member 44 is located generally between the two depending members 40, 42 and preferably has a generally pointed or rounded end. The pointed or rounded end puts a kink or bend 46 in the wire when the wire is sandwiched between the body 10 and the cover 22 in the closed position. Other means of forming a kink or bend in the wires may be employed. For example, two members could extend up from the body 10 in opposition to and laterally spaced from a single member depending from the cover 22.

Secondary wire strain relief is provided by forming the end 48 of the cover 22 adjacent the outer depending member with a curved surface. The curved end ensures that the wire does not bend sufficiently to cause a break in the wire. Such breaks are particularly prone to occur due to handling during manufacture or replacement.

Referring to FIG. 8, each box terminal 20 comprises a box formed, for example, by a strip of a metal or other suitable conductive material shaped into a box shape. The ends 50, 52 of the strip are fastened in any suitable manner. Each box is disposed in the connector body to surround an associated initiator pin 18 when the connector is mounted in the squib receptacle. One wall of each box also has a louver 54 formed therein, as by punching out a section of the wall to provide a three-sided structure. The louver forms a portion of a secondary terminal latch, discussed further below.

Each box terminal 20 further includes two contact beams 56 which are preferably integrally formed with the box and are bent to extend upwardly within the box. When the connector is mounted within a squib receptacle, the contact beams contact the initiator pins adjacent the free ends thereof. Preferably, the contact beams are biassed inwardly, due, for example, to the spring-like flexibility of the material forming the beams, to ensure good contact between the free ends and the initiator pins.

Each contact beam is relatively flat at its base near its connection with the box and is curved near its free end 60 to wrap around the initiator pin 18, as shown schematically in FIG. 8. FIG. 8 illustrates the curved portion of the contact beam in continuous contact with the initiator pin. In actuality, the contact beam contacts the initiator pin at discrete points. The curve provides at least two points of contact between each contact beam and its associated initiator pin. Thus, for each box terminal, at least four points of contact are provided between the terminal and the initiator pin.

A gold stripe is plated onto each contact beam at the area 64 where the beam contacts the initiator pin. Gold is a good conductive material, thus improving the contact between the box terminal and the initiator pin. Other conductive materials, such as silver, palladium, or silver/palladium alloys, which can be plated or otherwise suitably deposited onto the beam can be used.

A lubricating material is also provided on each contact beam below the gold stripe to reduce friction during insertion of the initiator pin between the two opposed beams, so that the initiator pin can be properly seated between the beams for good contact with the gold stripes. Preferably, the lubricating material is formed from gold flashed onto the beam. In prior art connectors, the lubricating material is a tin/lead material. However, during insertion, the lubricating material tends to get pushed up into the gold stripe area, impairing the contact between the gold stripe and the initiator pin. Thus, the lubricating material is preferably the same as the material forming the conductive stripe. Other materials, such as silver, palladium, or silver/palladium alloys, which can be flashed or otherwise suitably deposited onto the beams, can be used.

Each box terminal 20 is held within the connector body 10 by a primary terminal latch 66 and a secondary terminal latch 68. The primary latch is formed by a pair of first arms 70 depending at a slight angle to contact a top edge of the box of an associated box terminal 20. The top edge is the strongest part of the box terminal. Preferably, a shoulder is formed in the end of the first arm and is configured to seat against the top edge.

The secondary latch 68 is formed by a pair of second arms 72 depending, also preferably at a slight angle, to contact the end of the louver 54 formed in one wall of the associated box terminals. The end of the second arm also has a shoulder formed therein and is configured to seat against the end of the louver.

The box terminal 20 is inserted into the connector body 10 by pushing it down through the top. The box pushes the first and second arms 70, 72 to the side as it is inserted. The arms snap back into the latching position once the box terminal has passed. Once in place, each box terminal is held securely between the first and second terminal latches and a floor 74 of the connector body. The combination of the primary and the secondary terminal latches increases resistance to pulling the terminal out of the body. It will be appreciated that other latching configurations are possible to retain the terminal in the body.

To keep out dust and moisture, the cover 22 is sized to fit over the areas in which the wire, wire crimping device, ferrite body, and box terminals are disposed. The cover and the connector body are fastened together, as by sonic welding or other suitable method, once the box terminal and the wires have been inserted in the body.

The CPA/CLA 24 lies over the top of the cover 22 and extends beyond the edges of the cover. The CPA/CLA is hinged to the connector body 10 at the rear end thereof. Preferably, the CPA/CLA includes a hinge pin 76 integrally molded to the CPA/CLA to form a unitary structure. The hinge pin fits within suitable recesses formed in the connector body to receive the hinge pin.

The CPA comprises a connector position assurance mechanism to ensure that the connector is properly positioned on the initiator pins. The squib receptacle includes two recesses 80 therein, best seen in FIGS. 3 and 5, into which corresponding latching lugs 84 formed on the connector body 10 fit to retain the connector within the receptacle. Each latching lug is located near the base of an associated latching beam 88 formed on opposed sides of the connector body. Each latching beam may be formed by cutting two parallel slits in the connector body and extending into the cylindrical portion which fits within the squib receptacle. The CPA/CLA includes two openings 94 therein located to receive the ends of the latching beams 88 when the CPA/CLA is in the closed position. The latching beams cannot fit into the openings unless the connector is properly seated and locked into the squib receptacle.

Figure 4:
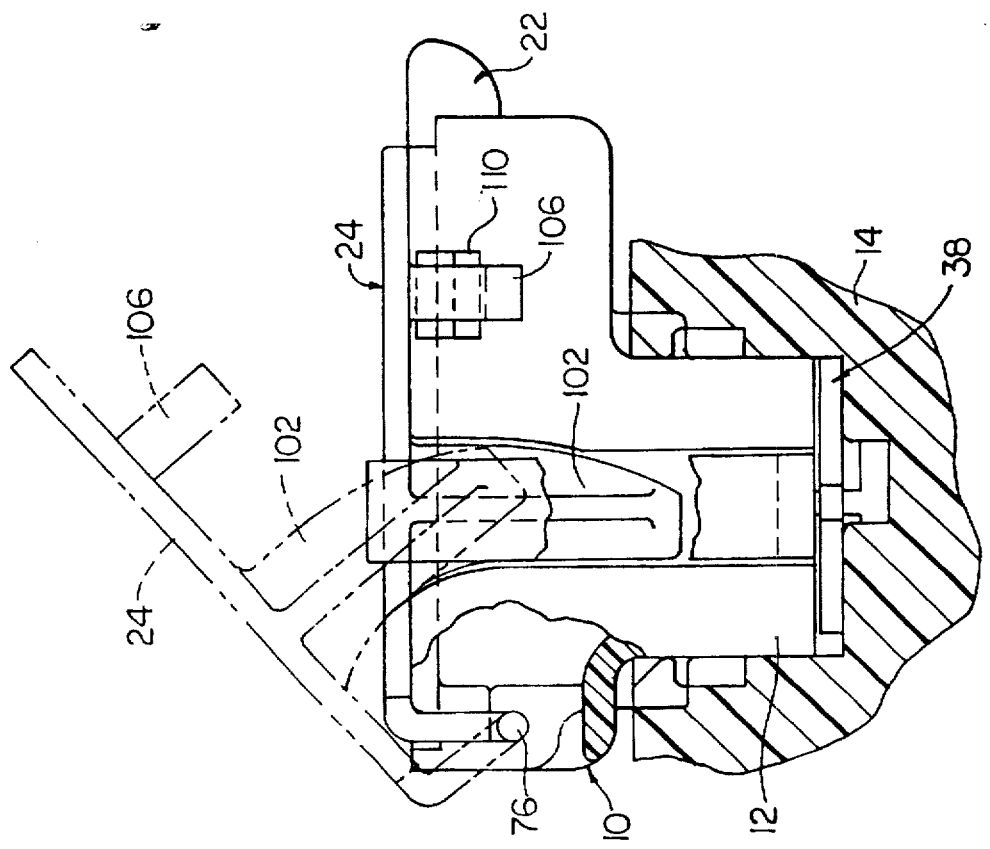
FIG. 4 is a side view of the squib connector of FIG. 1.
Figure 5:
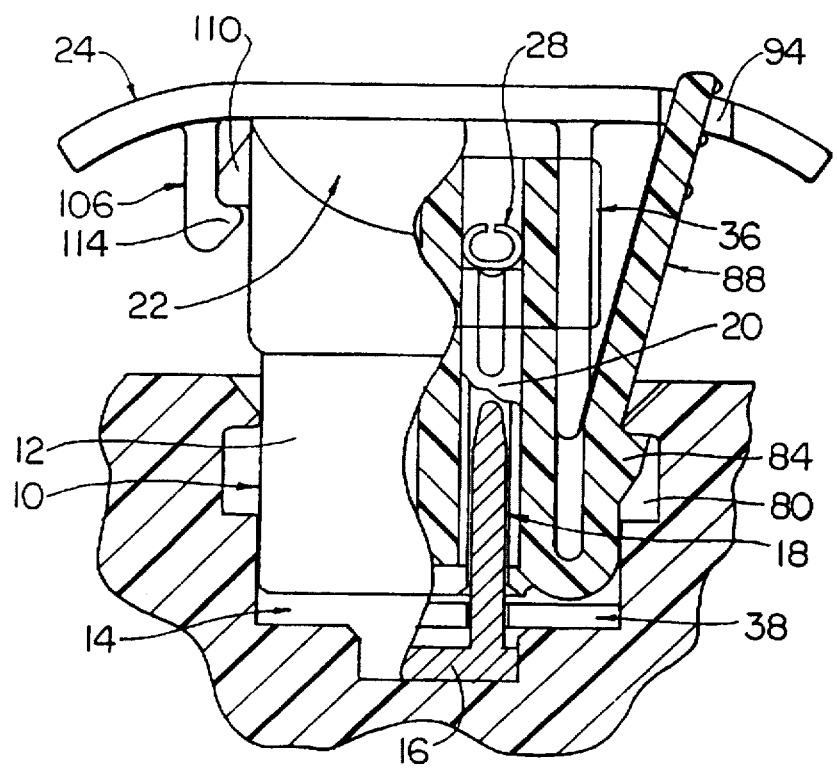
FIG. 5 is a further partial cross-sectional end view of the squib connector of FIG. 1.
Figure 6:
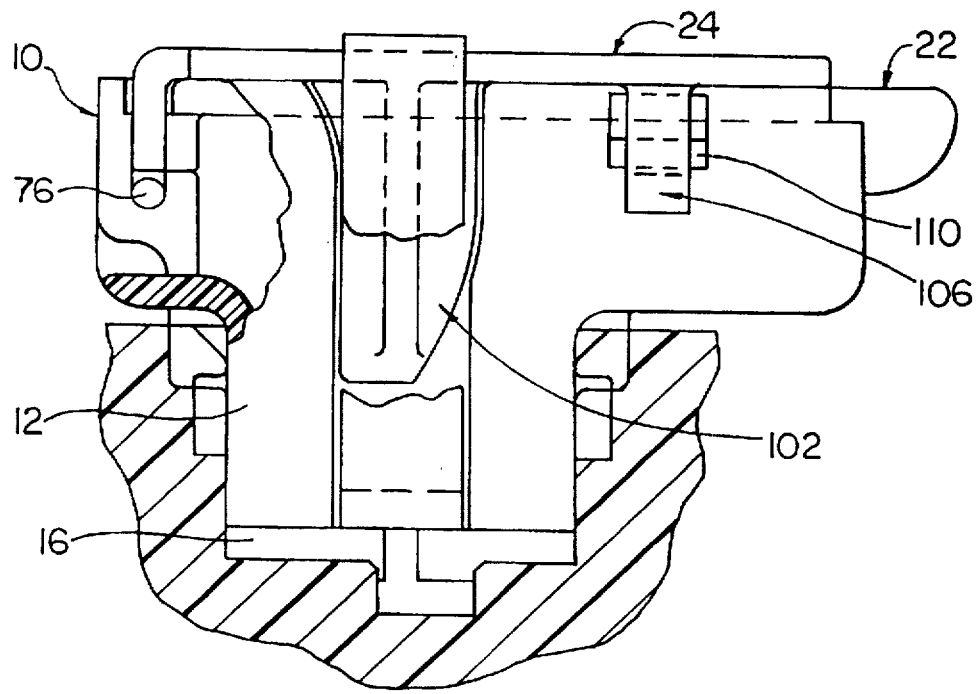
FIG. 6 is a cut-away side view of the squib connector of FIG. 1.
Figure 7:
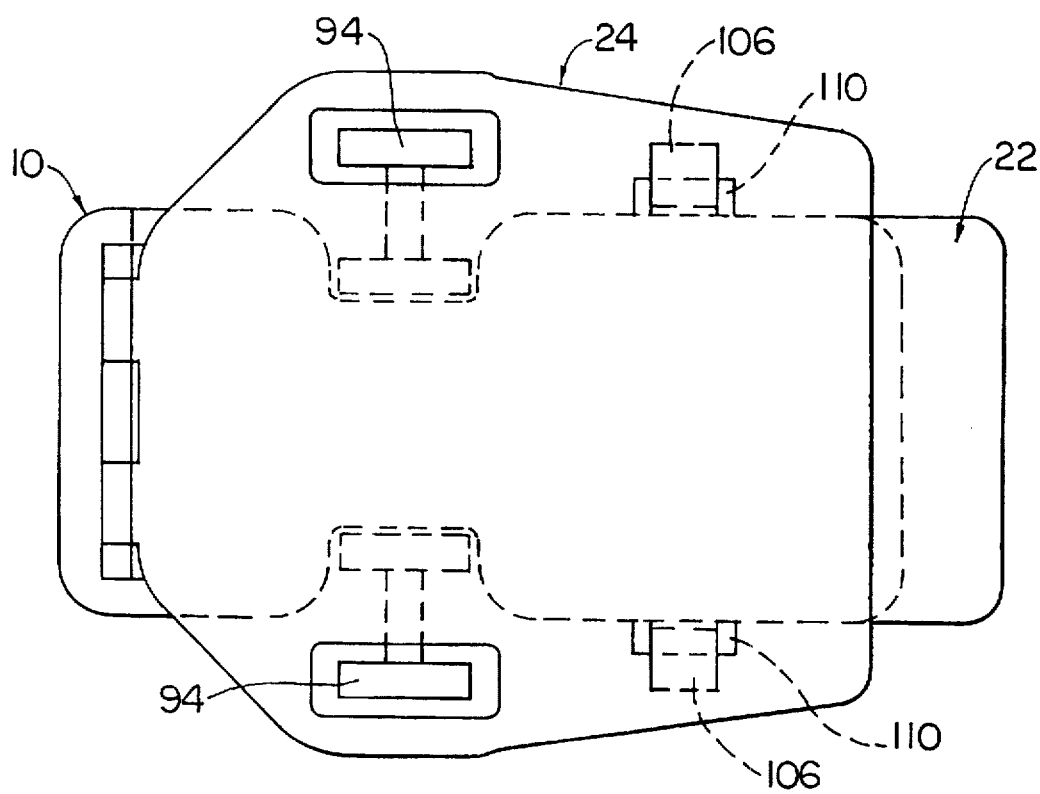
FIG. 7 is a top plan view of the squib connector of FIG. 1.

The connector also provides a lock assurance mechanism (CLA) to ensure that the connector is locked into the squib receptacle. To remove the connector from the receptacle, the CPA/CLA is pivoted up, allowing the latching beams 88 to be squeezed inwardly, thereby allowing the latching lugs 84 to move out of the recesses 80 in the squib receptacle. The connector can then be lifted out of the receptacle. The CPA/CLA 24 includes two depending wedge members 102 located to fit between each latching beam 88 and an exterior surface 90 of the connector body 10. When the CPA/CLA 24 is rotated into the closed position, the wedges 102 are positioned between the latching beams and the connector body, thereby forcing the latching beams outwardly and preventing the latching beams from being squeezed inwardly. In this manner, the connector is locked into the squib receptacle. The connector cannot be removed until the CPA/CLA is rotated to an open position. As shown in FIGS. 4 and 6, the wedge members are curved to allow them to be rotated down into the respective spaces provided in the connector body. The surfaces of the connector body may also be curved as needed to accommodate the wedge members.

The CPA/CLA 24 includes a latching mechanism to hold the CPA/CLA and cover in the closed position. In the preferred embodiment, latching fingers 106 depend from an underside of the CPA/CLA to mate with suitable lugs 110 extending outwardly from the wall of the connector body 10. Each latching finger includes an inwardly directed tab 114 formed on an end thereof to fit beneath the associated lug when the CPA/CLA is in the closed position. The fingers are generally sufficiently resilient to allow the tabs to slip past the lugs during rotation of the CPA/CLA to remove the connector. Other suitable latching mechanisms can be used to hold the CPA/CLA in the closed position.

One or more orientation keys 118 may be provided on the connector body to orient the body properly in the squib receptacle. For example, a lug or pair of lugs may be provided extending from the outside of the body to fit within associated recesses formed in the squib receptacle. Other suitable orientation devices may be provided.

The invention is not to be limited by what has been particularly shown and described, except as indicated by the appended claims.

I claim:

1. A squib connector for an automotive air bag assembly having a squib, the squib having a pair of terminal pins anchored thereto and extending upwardly in a squib connector receiving receptacle, said squib connector comprising:

a connector housing having a portion adapted to mate with the receiving receptacle of the squib, said connector housing having a wire entrance, said connector housing further having an internal floor and a terminal latching assembly; and a terminal assembly disposed within said connector housing for electrical communication with the terminal pins of the squib and a pair of electrical wires entering said connector housing through said wire entrance, said terminal assembly comprising a pair of box elements and a pair of opposed contact beams integrally formed with each box element and disposed to extend within each box element from a base region of each box element in a direction away from the floor of the connector housing to contact the terminal pins of the squib, said terminal assembly retained within said connector housing between and in contact with generally opposed faces of said internal floor at said base region and said terminal latching assembly at an upper region spaced from said base region.

2. The squib connector of claim 1, wherein said terminal latching assembly comprises a pair of retaining members each disposed in opposition to said internal floor to contact an upper surface of a respective one of said pair of box elements to retain said pair of box elements between said internal floor and said retaining members.

3. The squib connector of claim 2, wherein said pair of retaining members comprise resilient arms angled downwardly and inwardly toward the box elements.

4. The squib connector of claim 1, wherein said box elements each include an outwardly extending member and said terminal latching assembly includes a pair of retaining members each disposed in opposition to said internal floor to contact said outwardly extending members to retain said pair of box elements between said internal floor and said retaining members.

5. The squib connector of claim 4, wherein said outwardly extending members have a louver configuration.

6. The squib connector of claim 4, wherein said pair of retaining members comprise resilient arms angled downwardly and inwardly toward the box elements.

* * * * *